UNITED STATES PATENT OFFICE.

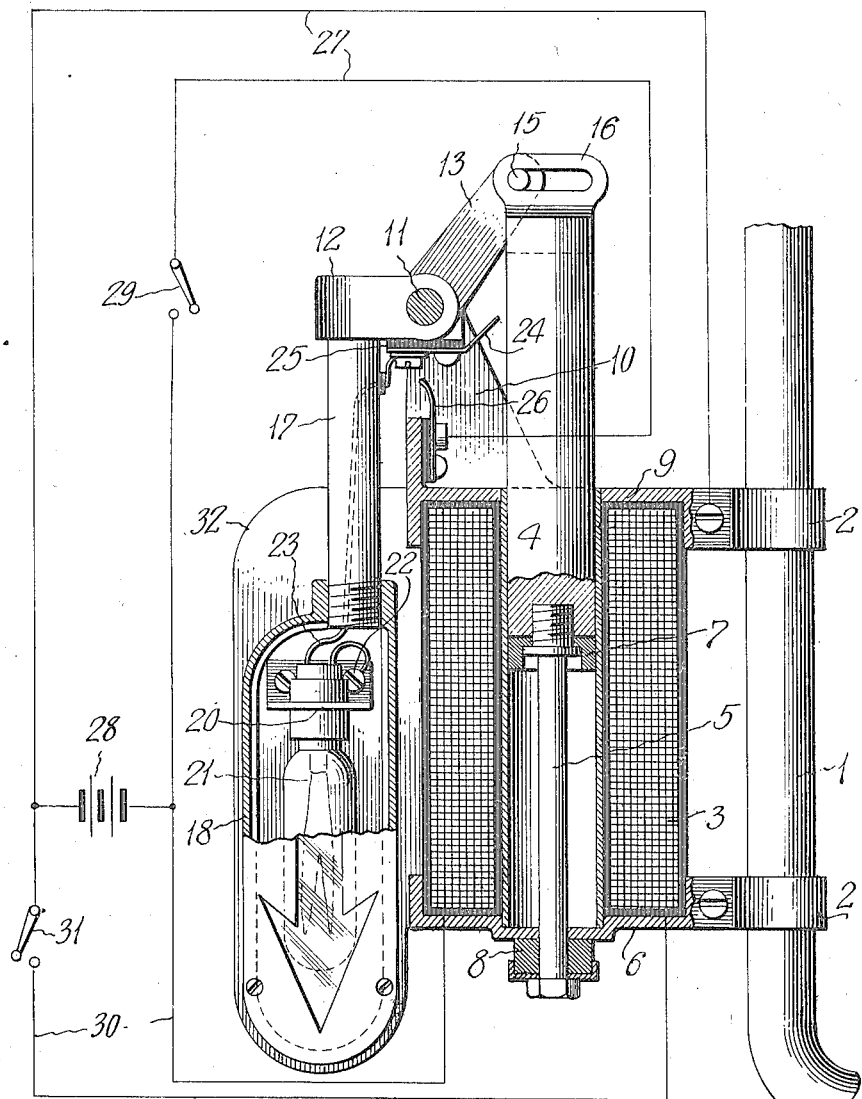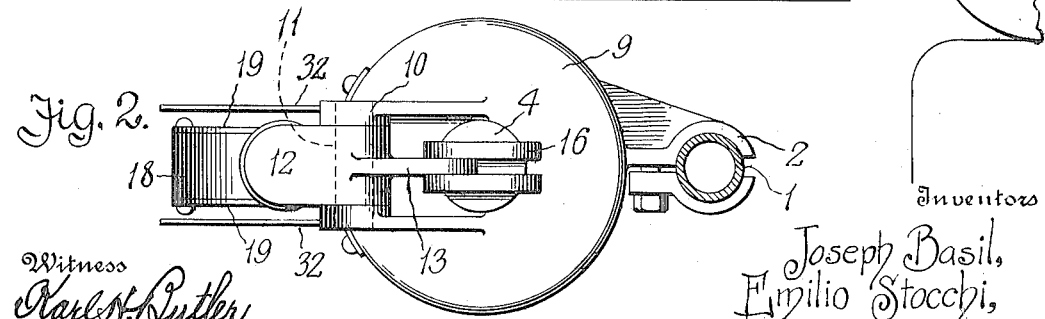

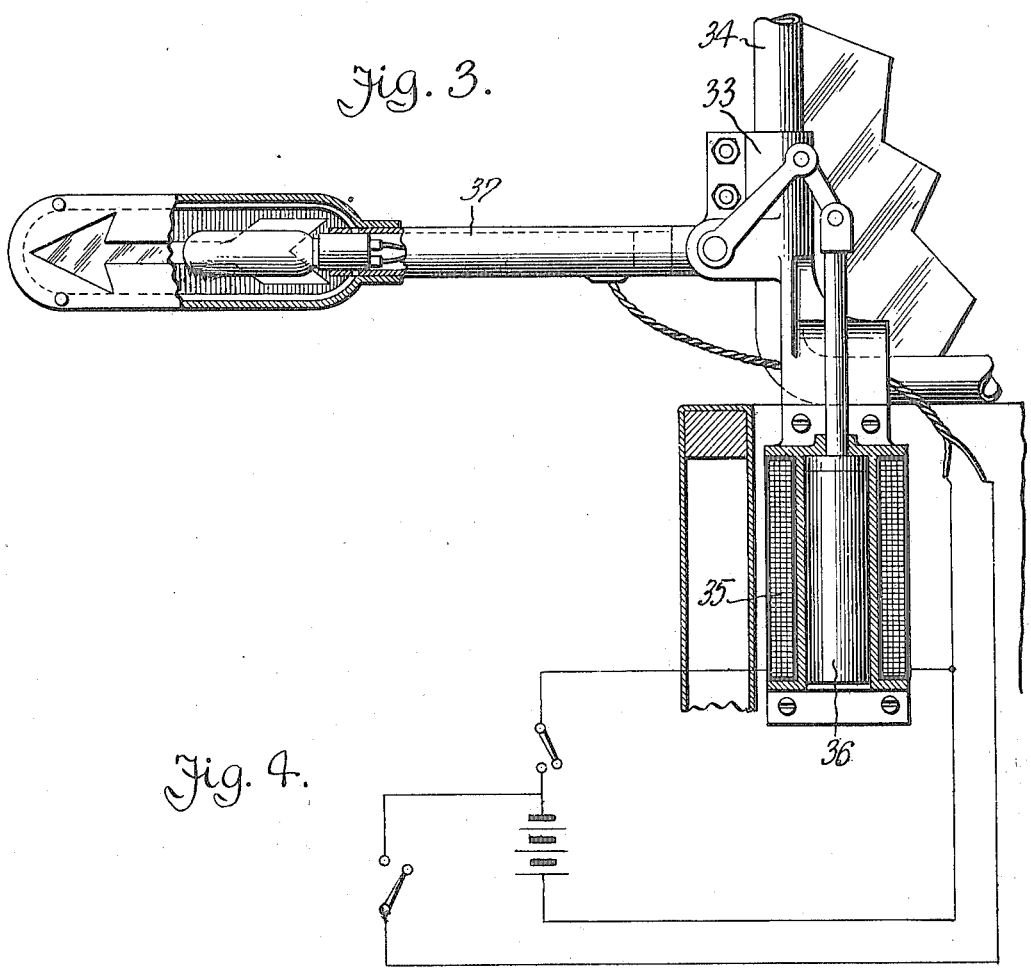
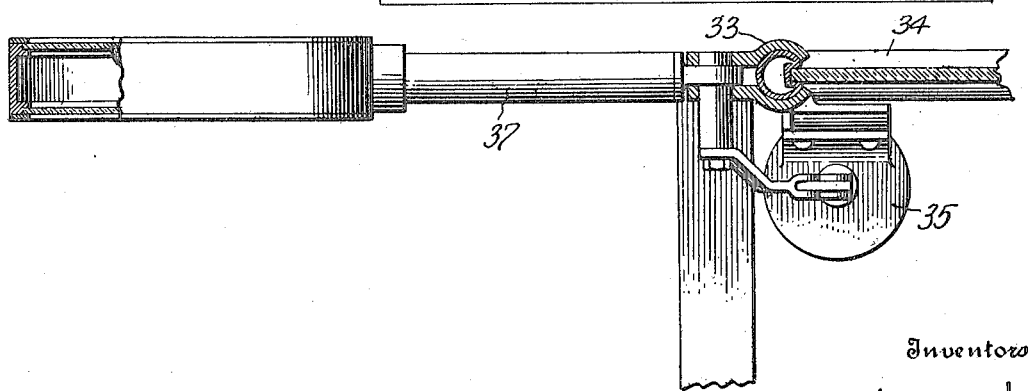

JOSEPH BASIL AND EMILIO STOCCHI, OF DETROIT, MICHIGAN.

AUTOMOBILE-SIGNAL.

1,264,596. Specification of Letters Patent. Patented Apr. 30, 1918.

Application filed April 30, 1917. Serial No. 165,343.

*To all whom it may concern:*

Be it known that we, JOSEPH BASIL and EMILIO STOCCHI, subjects of the King of Italy, residing at Detroit, in the county of Wayne and State of Michigan, have invented certain new and useful Improvements in Automobile-Signals, of which the following is a specification, reference being had therein to the accompanying drawings.

This invention relates to an automobile signal, and our invention aims to provide an electrically actuated semaphore arm that may be easily and quickly attached to the frame of a windshield or a suitable part of an automobile, so that the semaphore arm may be swung upwardly to indicate that the signal carrying automobile is about to stop or turn into another lane of travel. The signal includes a solenoid having the core thereof articulated relative to a pivoted semaphore arm, and the solenoid is adapted to be energized from a suitable source of electrical energy, as batteries, and the same source of electrical energy used for illuminating the outer end of the semaphore arm at night. Switches or push buttons of conventional form are employed for controlling the electric circuit.

Our invention will be hereinafter specifically described and then claimed, and reference will now be had to the drawings, wherein—

Figure 1 is a front elevation of the automobile signal, partly broken away, and partly in section, illustrating diagrammatically the electrical wiring in connection with the signal;

Fig. 2 is a plan of the same;

Fig. 3 is a front elevation of a modified form of signal, partly broken away and partly in section, showing the wiring in connection therewith; and Fig. 4 is a plan of the same, partly in section.

Considering Figs. 1 and 2, the reference numeral 1 denotes a portion of the frame of a windshield, as ordinarily supported by the dash of an automobile, and connected to the side of the frame by clamps 2 or other fastening means is a vertically disposed solenoid 3 having a core 4 adapted to move in one direction by gravity and in the opposite direction when said solenoid is energized. The lower end of the core 4 has a rod 5 extending through the bottom plate or cap 6 of the solenoid and the upper end of the rod 5 is provided with a cushion member 7, preferably made of rubber, or a yieldable material, to engage the plate or bottom cap 6 and cushion the descent of the core 4 in the solenoid. The lower end of the rod 5 has another cushion member 8 adapted to engage the bottom plate or cap 6 of the solenoid and cushion an upward movement of the core 4, said cushion members coöperating in eliminating noise during the operation of the solenoid.

The top plate or cap 9 of the solenoid is provided with an upstanding bracket or bearing 10 for a pivot pin 11. On this pivot pin is a bell crank having a short socket member 12 and a long arm 13. The long arm 13 is connected to a right angular slotted extension 16 of the upper end of the core 4 by a transverse pin 15.

The socket member 12 is provided with a tubular arm 17 and mounted on the outer end of said tubular arm is an oblong casing 18. The oblong casing has detachable side walls 19 and these side walls may have transparent or tranlucent portions and in some instances may be provided with openings. In either instance, the transparent, translucent or open portions will be in the form of the characters of a certain word, as "stop", "right", "left" or arrow shaped, as shown in Fig. 3.

Mounted in the casing is a holder 20 for an incandescent bulb or lamp 21. One lead-in wire 23 extends through the tubular arm 17 and is connected to a contact member 24 carried by the bell crank and insulated therefrom, as at 25. The contact member 24 is disposed at an angle so as to engage the contact member 26 attached to and insulated from the bracket 10 of the solenoid 3. The bracket 10 and one of the windings of the solenoid are connected by wires 27 to a suitable source of electrical energy, as batteries 28, and a switch 29 is included in this circuit.

The solenoid is also connected by wires 30 to the same source of electrical energy and a switch 31 controls the operation of the solenoid.

Suitably connected to the solenoid 3 are side shields 32 for the casing 18, said side shields rendering the casing invisible when said casing is in an inactive position. The weight of the casing 18 is sufficient to cause said casing to assume an inactive position between the shields 32, by gravity and when in such a position the contact members 24 and 26 are separated and the core 4 is in an elevated position within the solenoid 3. When the solenoid 3 is energized by closing the switch 21, the core 4 is lowered and the bell crank actuated to swing the casing 18 outwardly to a horizontal position. If the switch 29 is closed the contact members 24 and 26 establish an electric circuit in connection with the lamp 21, so that the interior of the casing 18 will be illuminated and a sign displayed at both sides thereof. At night, the switch 29 may be closed and during the day left open, so that the semaphore arm can be used for signaling purposes without necessarily being illuminated.

In Figs. 3 and 4, there is illustrated a slight modification of our invention, wherein a double bracket 33 is attached to the frame of a windshield 34. This double bracket has a solenoid 35 provided with a gravity core 36, said core being articulated with a semaphore arm 37 pivotally supported by the double bracket. The semaphore arm 37 is somewhat similar to the preferred form of semaphore arm and the weight of the core 36 is adapted to hold said arm in a vertical inactive position, but when the solenoid 35 is energized to elevate the core 36, then the semaphore arm is swung downwardly to a horizontal position, as shown in Fig. 3. That portion of the double bracket 33 supporting the solenoid 35 may conveniently extend down into the body of an automobile, thus allowing the semaphore arm to be placed in proximity to the lower rail of the windshield frame.

It is thought that the electrical connections, operation and utility of both forms of signals will be apparent without further description, and while in the drawings there are illustrated the preferred embodiments of our invention, it is to be understood that the structural elements are susceptible to such variations and modifications as fall within the scope of the appended claim.

What we claim is:—

In an automobile signal the combination with a suitable source of electrical energy, of a solenoid in a normally open circuit with said source of electrical energy and adapted for attachment in a vertical position to an automobile, a bracket carried by the upper end of said solenoid, a bell crank pivoted relative to said bracket, a semaphore arm carried by said bell crank and normally in an inactive position in parallelism with said solenoid, shields carried by said solenoid with said semaphore arm normally therebetween, a core in said solenoid articulated with said bell crank and adapted for raising said semaphore arm when said solenoid is energized, spaced cushioning members supported by the inner end of said core adapted to engage the lower end of said solenoid and limit the movement of the core therein, illuminating means for said semaphore arm in a normally open circuit with said source of electrical energy, and means carried by said bell crank and said bracket adapted for closing the circuit of said illuminating means when said semaphore arm is swung to an active position by the energizing of said solenoid.

In testimony whereof we affix our signatures in presence of two witnesses.

JOSEPH BASIL.
EMILIO STOCCHI.

Witnesses:
 KARL H. BUTLER,
 ANNA M. DORR.